(12) United States Patent
Arbitmann et al.

(10) Patent No.: US 8,355,842 B2
(45) Date of Patent: Jan. 15, 2013

(54) METHOD AND DEVICE FOR STEERING A MOTOR VEHICLE

(75) Inventors: Maxim Arbitmann, Rochester Hills, MI (US); Matthias Schorn, Mühltal (DE); Rolf Isermann, Seeheim (DE)

(73) Assignee: Continental Teves AG & Co. oHG (DE)

( * ) Notice: Subject to any disclaimer, the term of this patent is extended or adjusted under 35 U.S.C. 154(b) by 874 days.

(21) Appl. No.: 12/066,695

(22) PCT Filed: Sep. 15, 2006

(86) PCT No.: PCT/EP2006/066422
§ 371 (c)(1),
(2), (4) Date: Aug. 28, 2008

(87) PCT Pub. No.: WO2007/031578
PCT Pub. Date: Mar. 22, 2007

(65) Prior Publication Data
US 2009/0222166 A1   Sep. 3, 2009

(30) Foreign Application Priority Data

| Sep. 15, 2005 | (DE) | 10 2005 044 199 |
| Sep. 15, 2005 | (DE) | 10 2005 044 200 |
| Sep. 15, 2005 | (DE) | 10 2005 044 204 |
| Jan. 27, 2006 | (DE) | 10 2006 004 174 |
| Jul. 21, 2006 | (DE) | 10 2006 034 254 |
| Jul. 21, 2006 | (DE) | 10 2006 034 255 |
| Aug. 2, 2006 | (DE) | 10 2006 036 363 |

(51) Int. Cl.
  B62D 6/00       (2006.01)
  B62D 11/00      (2006.01)
  B62D 12/00      (2006.01)
  G06F 7/00       (2006.01)
  G06F 17/00      (2006.01)
  G06F 19/00      (2006.01)

(52) U.S. Cl. ......................................................... 701/41
(58) Field of Classification Search ................... 701/41, 701/42, 43, 44
See application file for complete search history.

(56) References Cited

U.S. PATENT DOCUMENTS

| 3,771,619 | A | 11/1973 | Schimkat |
| DE 38 | A1 | 3/1990 | |
| 30 | | | |
| 790 | | | |
| DE 38 | A1 | 3/1990 | |
| 30747 | | | |

(Continued)

FOREIGN PATENT DOCUMENTS

DE    2042429    3/1972

(Continued)

Primary Examiner — John Q Nguyen
Assistant Examiner — Michael Whalen
(74) Attorney, Agent, or Firm — RatnerPrestia

(57) ABSTRACT

A method for steering a motor vehicle in a collision avoidance maneuver ahead of an object in the front or lateral surroundings of the motor vehicle. It is arranged that a linear control method is employed, in which case one controller output signal ($\delta_{LLM1}; \ldots; \delta_{LLMN}$) each is determined in at least two linear controller modules depending on a deviation (e) between an actual position of the motor vehicle and a nominal position that is predetermined due to the avoiding path. The controller output signals ($\delta_{LLM1}; \ldots; \delta_{LLMN}$) are weighted with respectively one weighting factor ($\Phi_1; \ldots; \Phi_N$) that is established depending on the vehicle speed (v), and a steering angle of steerable wheels of the motor vehicle is established based on an arbitration of the weighted controller output signals. Furthermore, a device which is suitable to implement the method is provided.

13 Claims, 7 Drawing Sheets

U.S. PATENT DOCUMENTS

| | | | |
|---|---|---|---|
| 6,430,452 B1 * | 8/2002 | Feustel | 700/37 |
| 7,099,764 B2 * | 8/2006 | Seto et al. | 701/70 |
| 7,152,052 B2 * | 12/2006 | Cheng | 706/23 |
| 7,283,907 B2 * | 10/2007 | Fujiwara et al. | 701/301 |
| 7,778,753 B2 * | 8/2010 | Fujiwara et al. | 701/41 |
| 2005/0267660 A1 * | 12/2005 | Fujiwara et al. | 701/41 |
| 2005/0267683 A1 * | 12/2005 | Fujiwara et al. | 701/301 |

FOREIGN PATENT DOCUMENTS

| | | |
|---|---|---|
| DE | 100 36 276 A1 | 2/2002 |
| DE | 101 54 321 A1 | 7/2002 |
| DE | 102 31 556 A1 | 1/2003 |
| DE | 103 12 513 | 9/2004 |
| WO | WO 2004/085220 A1 | 10/2004 |

\* cited by examiner

METHOD AND DEVICE FOR STEERING A MOTOR VEHICLE

This application is the U.S. national phase application of PCT International Application No. PCT/EP2006/066422, filed Sep. 15, 2006, which claims priority to German Patent Application No. DE102005044204.8, filed Sep. 15, 2005, the contents of such applications being incorporated by reference herein.

BACKGROUND OF THE INVENTION

1. Field of the Invention

The present invention relates to a method for steering a motor vehicle in a collision avoidance maneuver ahead of an object in the front or lateral surroundings of the motor vehicle. Furthermore, the invention relates to a device for steering a motor vehicle in a collision avoidance maneuver ahead of an object in the front or lateral surroundings of the motor vehicle, which is suitable for implementing the method.

2. Description of the Related Art

One objective in the development of motor vehicles is related to driver assistance systems for the avoidance of accidents. These systems monitor the surroundings of the vehicle, decide whether a collision with an object is likely to occur and intervene into the steering system or the brake system of the vehicle in order to prevent the accident by avoiding or braking. It has been found out that collision avoidance maneuvers, especially at high vehicle speeds, offer advantages vis-à-vis emergency stops. To execute a collision avoidance maneuver, usually an avoiding path for the vehicle is predefined in an imminent collision. A steering actuator which allows setting a steering angle independently of the driver is used to steer the vehicle in such a fashion that it follows the avoiding path. The steering actuator is driven by a path follower controller. Due to the non-linear laterally dynamic behavior of the vehicle, relatively complex path follower controllers are required in this case so that the adjustment of the controller parameters for a defined type of vehicle frequently requires very high effort and structure.

SUMMARY OF THE INVENTION

In view of the above, an object of the invention is to provide a path follower control for performing an automatic avoiding maneuver, which can be adapted to different types of vehicles in a simplest possible fashion.

According to an aspect of the invention, this object is achieved by a method which is implemented with the following steps:

Calculating an avoiding path for the avoiding maneuver in front of the object, determining each one controller output signal based on a deviation between an actual position of the motor vehicle and a nominal position predetermined due to the avoiding path in at least two linear controller modules, weighting the controller output signals with respectively one weighting factor that is determined depending on the vehicle speed, determining a steering angle of steerable wheels of the motor vehicle by way of arbitration of the weighted controller output signals, and influencing a steering system of the motor vehicle according to the determined steering angle.

Furthermore, a device in accordance with at least one aspect of the invention comprises the following arrangements:

a path planning arrangement allowing calculation of an avoiding path for the avoiding maneuver, a controlling device comprising at least two controller modules, in which case each one controller output signal can be determined in the controller modules according to a deviation between an actual position of the motor vehicle and a nominal position predetermined based on the avoiding path, a weighting arrangement used to weight the controller output signals in each case with a weighting factor established depending on a vehicle speed, an arbitration device used to determine a steering angle of steerable wheels of the motor vehicle by way of arbitration of the weighted controller output signals, and a steering actuator controlling arrangement by which a steering actuator can be steered according to the steering angle, and a steering system of the motor vehicle can be influenced by means of the steering actuator.

Advantageously, a steering angle of steerable wheels of the motor vehicle is determined by way of linear controller modules. The controller modules are usually understood as controller modules in which there is a linear correlation between the output signals and the input signals. The linear controller modules are composed of linear transmission elements. The application of controller modules of this type renders it possible to parameterize the control units and to adapt them to certain vehicle types in a very simple manner. The adjustment of the controller modules is considerably simpler than this would be the case in a non-linear or adaptive control, for example. It has shown, however, that steering angle control by way of one single linear controller module cannot be performed with a sufficient rate of precision within the total speed range due to the non-linear transmission behavior of the vehicle. Therefore, a number of linear controller modules are used, the output signals of which are weighted with a speed-responsive weighting factor. The weighted output signals are arbitrated to determine the steering angle. Thus, the individual controller modules can be optimized for steering angle control in a defined speed range. The weighting operation of the controller output signals allows achieving that the major part of the steering angle in a defined speed range is detected by the controller module that is optimized for this range, while the other controller modules contribute to a less significant degree or to no degree at all.

In an embodiment of the method and the device it is arranged that the controller output signals are determined depending on a deviation between a nominal lateral offset predetermined by way of the calculated avoiding path and a determined actual lateral offset of the motor vehicle.

Favorably, a control operation with respect to the lateral dynamics is carried out in this embodiment. The term lateral offset herein refers to the lateral offset of the motor vehicle in a collision avoidance maneuver based on the start point of the collision avoidance maneuver.

An improvement of the method and the device provides that the controller output signals are determined depending on a deviation between a nominal lateral offset of the vehicle, which is predetermined by way of the calculated avoiding path for a predicted position of the vehicle, and a current actual lateral offset of the vehicle.

Advantageously, a deviation is thus determined between the current actual lateral offset of the vehicle and a nominal lateral offset, which is predetermined for a position of the vehicle that will be reached by the vehicle within a short time.

Delays in time in the control are avoided with the aid of such an anticipating control, whereby the accuracy of control is enhanced.

Furthermore, it is provided in an improvement of the method and the device that the deviation relates to an offset of the vehicle orthogonally relative to a central longitudinal axis of the vehicle.

Advantageously, the deviation in this improvement is considered in a reference system fixed in the vehicle. It has been proved that the accuracy of the control can be improved further hereby.

An embodiment of the method and the device comprises that the linear controller modules are at least partly proportional-differential controllers.

The use of controllers of this type renders a particularly simple parameterization and adjustment of the individual controller modules possible.

An improvement of the method and the device arranges for the controller modules to comprise at least partly one proportional element and one element for processing the deviation of the motor vehicle from a position.

The use of a latter element achieves stabilization of the control in particular.

Another embodiment of the method and the device implies that a center-of-gravity speed is associated with each controller module and that a weighting factor is essentially other than zero only in a speed interval which contains the center-of-gravity speed.

The center-of-gravity speed and the speed interval allow favorably defining the speed ranges in which the individual controller modules shall determine the steering angle to a pronounced degree.

Furthermore, an embodiment of the method and the device is characterized in that the weighting factors assume the shape of $$\Phi_i = \frac{\mu_i(v)}{\sum_{j=1}^{N} \mu_j(v)}$$

with $$\mu_i(v) = \exp\left(-\frac{(v - c_i)^2}{2\sigma_i^2}\right)$$

where $c_i$ is the center-of-gravity speed, $\sigma_i$ is a predetermined parameter and N designates the number of the controller modules.

Favorably, the weighting factors are defined in this case by way of bell-shaped curves, from which result the speed ranges associated with the controller modules.

In addition, an improvement of the method and the device involves that a regulating component of the steering angle is established based on the arbitration of the weighted controller output signals and that the steering angle comprises a controlling component in addition.

The pilot control by way of the controlling component principally allows reliable steering of the vehicle without the delays in the steering angle setting which occur in a feedback. However, deviations are encountered due to inaccuracies in the pilot control and due to disturbances. These inaccuracies are adjusted using the regulating component of the steering angle.

In an embodiment of the method and the device, it is arranged that the controlling component of the steering angle is determined based on an inverse single-track model of the motor vehicle.

The advantage of the single-track model is especially seen in its ease of handling, which is in particular due to the simple parameterization.

An embodiment of the method and the device provides that the controlling component of the steering angle is given by $$\delta_{MFF} = i_s\left(\frac{l}{R} + EG \cdot \frac{v^2}{R}\right)$$

where $i_s$ a transmission factor, l is a wheel base of the motor vehicle, EG is a self-steering gradient of the motor vehicle, v is a speed of the vehicle and 1/R refers to a curvature of the avoiding path.

In addition, a computer program product is made available, which defines an algorithm that comprises a method of the type illustrated before.

The invention contains the idea of steering a motor vehicle in a collision avoidance maneuver with the aid of linear controllers. In order to take into account the non-linearities in the performance of the motor vehicle, several linear controller modules are employed which are in each case optimized at a working point for the steering angle control.

To determine the steering angle, the output signals of the controller modules are weighted and arbitrated, and the working points of the controller modules are taken into consideration in the weighting operation. This way, the steering angle in a defined speed range is calculated to a major extent by the controller module which is optimized for this speed range.

These and other aspects of the invention are illustrated in detail by way of the embodiments and are described with respect to the embodiments in the following, making reference to the Figures.

DETAILED DESCRIPTION OF THE PREFERRED EMBODIMENTS

Figure 1:
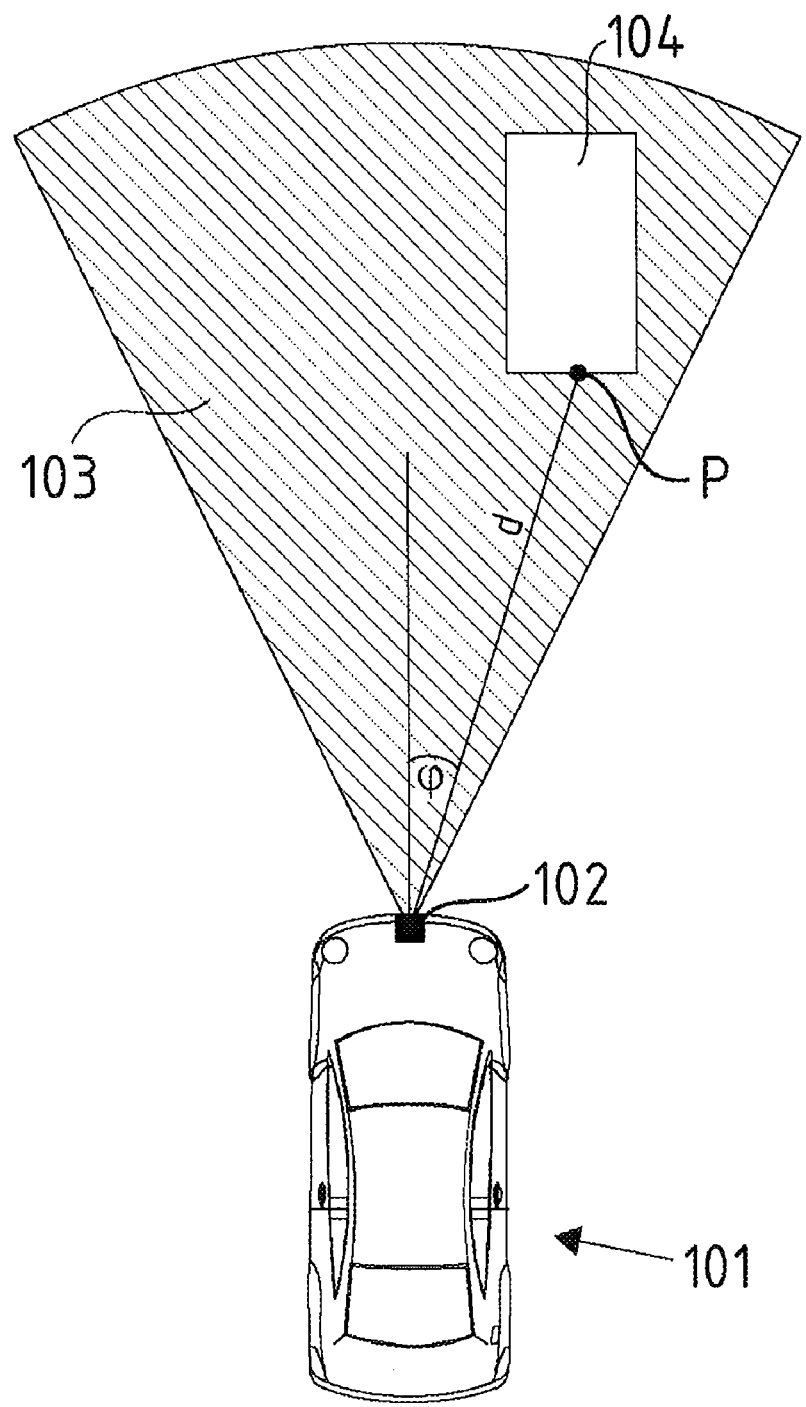
FIG. 1 is a schematic representation of a vehicle with an ambient sensor for detecting objects in the surroundings of the vehicle.

Illustrated in FIG. 1 is a vehicle 101 that has an ambient sensor 102, with the aid of which it is possible to detect in the surroundings of the vehicle 101 objects that are, in particular, further motor vehicles which are moving in the same driving lane or in an adjacent one. Shown by way of example is an ambient sensor 102 with a coverage 103 that comprises a solid angle ahead of the vehicle 101 in which, for example, an object 104 is illustrated. The ambient sensor 102 is preferably a LIDAR (Light Detection and Ranging) sensor that is known per se to the person skilled in the art; equally, however, it is also possible to use other ambient sensors. The sensor measures the distances d from the detected points of an object 104 and the angles φ between the connecting straight lines to these points and the central longitudinal axis of the vehicle 101, as is illustrated in FIG. 1 by way of example for a point P of the object 104. The fronts of the detected objects 104, which face the vehicle 101, are composed of a number of detected points, in which case an object detection unit to which the sensor signals are transmitted produces the correlations between points and the shape of an object 104 and determines a reference point for the object 104. By way of example, it is possible in this case for the reference point to be selected as the midpoint of the object 104 or the midpoint of the detected points of the object 104. The speeds of the detected points, and thus the speed of the detected objects 104, cannot be directly measured by means of the ambient sensor 102. They are calculated from the difference between the distances, measured in successive time steps, in the object detection unit of clockwise operation. In a similar way, it is also possible in principle to determine the acceleration of the objects 104 by two-fold derivation of their position.

Figure 2:
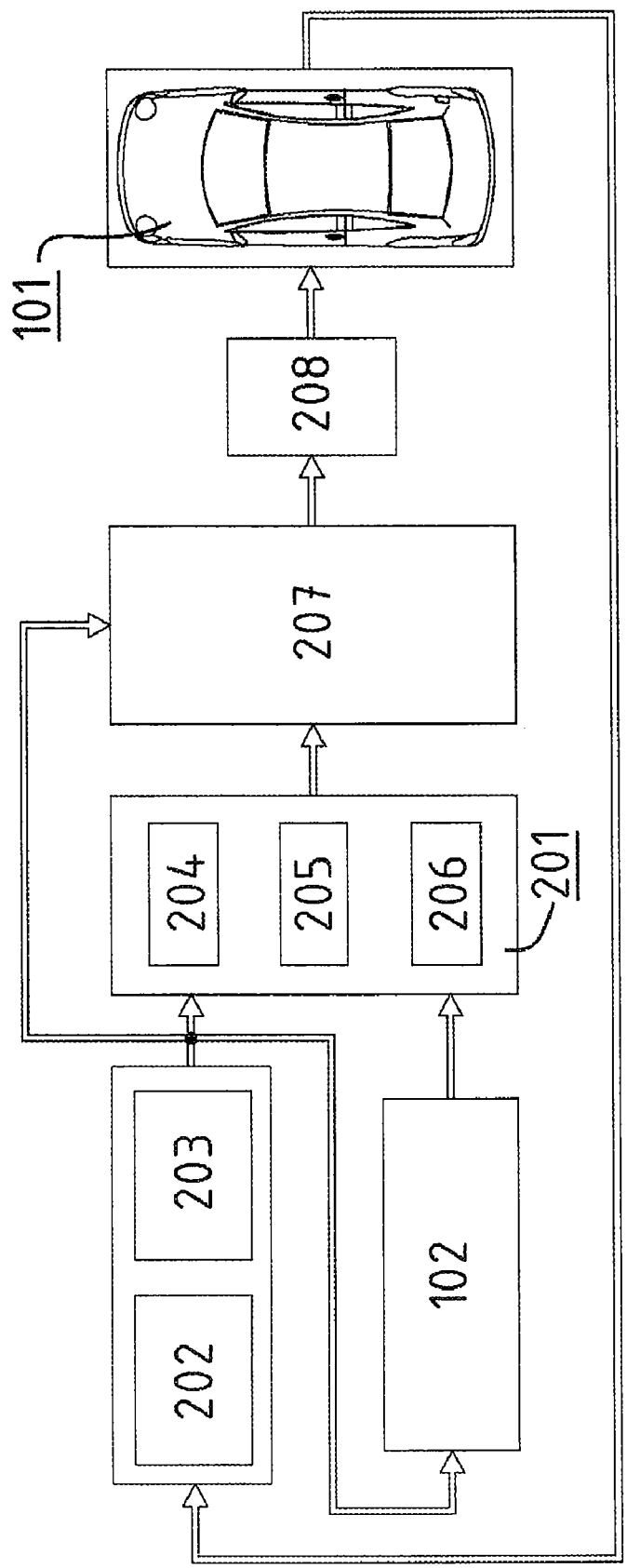
FIG. 2 is a schematic block diagram of a driver assistance system for performing a collision avoidance maneuver to avoid a collision with an object.

FIG. 2 is a schematic block diagram view of the structure of a driver assistance system to avoid accidents. The object data determined by means of the ambient sensor is transmitted in the shape of electronic signals to block 201 of the system. In addition, motion quantities of the vehicle 101 are sent to the block, which have been detected by means of a vehicle sensor system 202 or are calculated in block 203 based on the sensor signals. An object trajectory is defined in block 201 in a prediction arrangement 204 based on the information about the object 104. Furthermore, a trajectory of the vehicle is determined based on the detected and calculated motion data of the vehicle 101. In particular, the vehicle speed which can be detected e.g. by means of wheel rotational speed sensors, the steering angle at the steerable wheels of the vehicle 101 that is measured by means of a steering angle sensor, the yaw rate and/or the lateral acceleration of the vehicle 101 which are measured using corresponding sensors are taken into consideration to calculate the vehicle trajectory. Subsequently, a check is made in a decision arrangement 205 whether the motor vehicle 101 is on a course of collision with one of the detected objects 104. In case a like collision course is identified and the so-called time to collision (TTC, Time To Collision), i.e. the duration until the determined collision with the object 104, falls below a defined value, a release signal is sent to a path planning arrangement 206. The release signal causes an avoiding path to be initially calculated within the path planning arrangement 206 in the shape of a flat curve with the representation $y_R = f(x)$. Thereafter, the determined avoiding path is used to set a start point for the collision avoidance maneuver at which the collision avoidance maneuver must be started in order to be still able to avoid the object 104. These steps are repeated preferably in time steps until the risk of collision no longer exists due to changes of the course of the object 104 or the vehicle 101, or until the vehicle 101 reaches the start point for a collision avoidance maneuver. If this is the case, the avoiding path or parameters representing this path are submitted to a regulating arrangement 207. Said arrangement will then determine a steering angle as a controlled variable according to which a steering actuator of the vehicle 101 is driven by a steering actuator controlling arrangement 208. The steering actuator is a steering angle setting unit which allows setting steering angles at the steerable wheels of the motor vehicle 101 which make the motor vehicle 101 follow the avoiding path. The steering angle setting unit is e.g. configured as a per se known overriding steering system which allows setting a steering angle at the front wheels of the motor vehicle 101 independently of the driver.

The avoiding path can be predetermined in manifold ways. One example is a preset path in the form of a polynomial or in the form of joined clothoid arcs. A preset path in the form of a sigmoid has proved especially favorable, which holds for $$y_R = f(x) = \frac{B}{1 + \exp(-a(x-c))}$$

The parameters B, a and c are determined according to the driving situation. The parameter B corresponds to the maneuver width of the avoiding maneuver, i.e. the desired lateral offset of the vehicle 101. For example, it holds for the parameter c $$c = \pm \frac{1}{a} \ln\left(\frac{D}{y_{tol}} - 1\right)$$

where $y_{tol}$ is a predetermined low tolerance value which is introduced because the curve $y_R = f(x)$ does not extend through the origin of the system of coordinates. In the selection of the system of coordinates as will be described below, the positive sign is chosen in an avoiding maneuver to the left and the negative sign is chosen in an avoiding maneuver to the right. The parameter a defines the gradient of the sigmoid and can e.g. be selected depending on the vehicle speed in such a manner that the lateral acceleration of the vehicle 101 that occurs in the avoiding maneuver and/or the rate of change of the lateral acceleration do not exceed predetermined maximum values.

Figure 3:
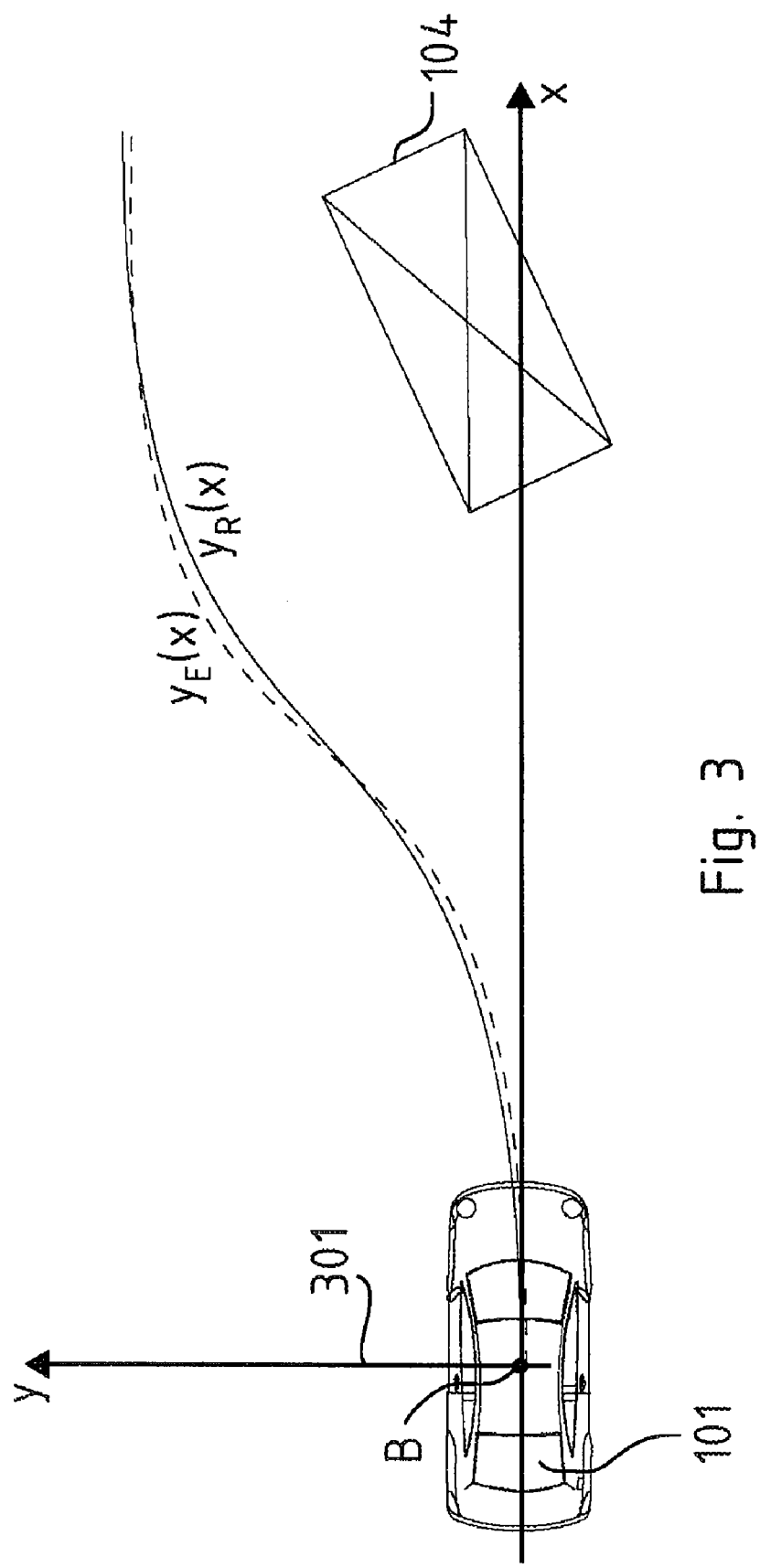
FIG. 3 is a schematic representation of an avoiding path and a system of coordinates in which the avoiding path can be described.

In FIG. 3, a predetermined path $y_R(x)$ (solid line) and an actual path $y_E(x)$ (dotted line) in an avoiding maneuver ahead of an object 104 are illustrated by way of example. Likewise illustrated is a favorable fixed system of coordinates 301 for indicating the avoiding path. The position of the origin of the system of coordinates 301 essentially corresponds to the position of a predetermined reference point B of the vehicle 101 at the start of the collision avoidance maneuver and is fixed for the duration of the collision avoidance maneuver. The positive x-axis of the system of coordinates 301 points in the vehicle's longitudinal direction as it prevails at the start point of the collision avoidance maneuver, and the positive y-axis points to the left with regard to this direction. An insignificant deviation between the position of the reference point B at the start of the collision avoidance maneuver and the origin of the system of coordinates can be encountered in the avoiding path shown above due to the tolerance $y_{tol}$. Other fixed systems of coordinates may be used as well. The predetermined lateral offset $y_R(x)$, the existing lateral offset $y_E(X)$ as well as the distance x are indicated for the reference point B of the vehicle 101.

Figure 4:
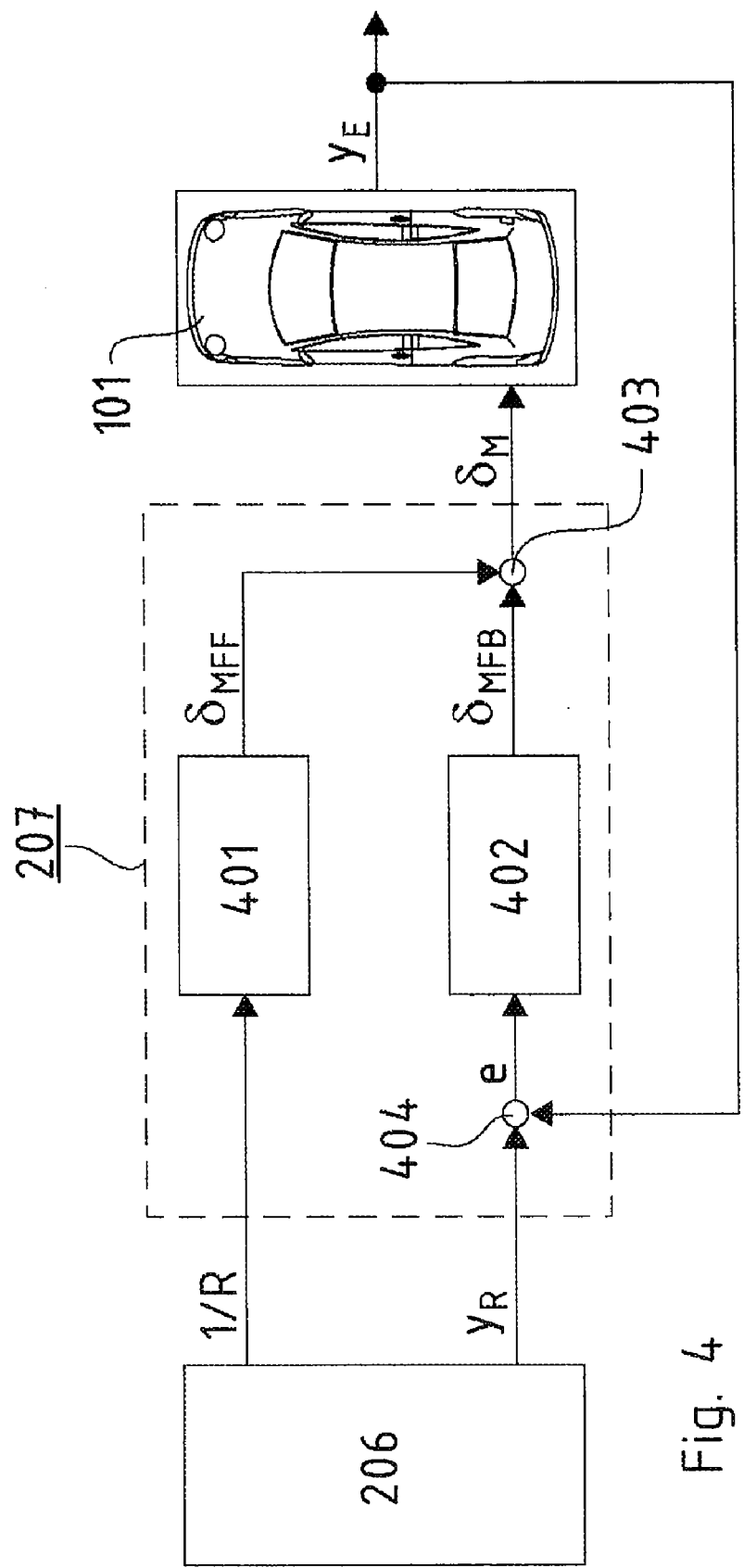
FIG. 4 is a schematic block diagram of a control circuit on which steering angle control is based.

The control circuit of the path follower control and the structure of the control unit 207 are shown in FIG. 4 in a schematic representation. As is illustrated in the Figure, the control unit 207 comprises a pilot control block 401 and a controlling block 402. In the pilot control block 401, an inverse motion model for the vehicle 101 is used to determine a controlling component $\delta_{MFF}$ of the steering angle $\delta_M$ to be set by means of the steering actuator. A stationary single-track model is preferably the basis in this case. The steering angle established in the pilot control block 401 corresponds to the steering angle which is to be set for circular travel on a given circle with radius R. Hence, it applies:

$$\delta_{MFF}(t) = i_s \cdot \left( \frac{l}{R(t)} + EG \cdot \frac{v^2(t)}{R(t)} \right) \quad (1)$$

In this case, 1/R(t) refers to the curvature of the predetermined avoiding path at the time t, v(t) is the vehicle speed at the time t, l refers to the wheel base of the vehicle 101 and EG to the so-called self-steering gradient of the vehicle 101. The variable $i_s$ the transmission factor between the steering angle with respect to the steering handle manipulated by the driver and the steering angle with respect to the steerable wheels of the vehicle 101. The transmission factor allows taking into consideration that the controlled variable for driving the steering actuator usually corresponds to a steering angle with respect to the steering handle. To execute path control, the x- and y-coordinates $x_E(t)$ and $y_E(t)$ of the actual positions of the vehicle 101 or its reference point B within the system of coordinates 301 are determined in each time step of the control unit 207 of clocked operation. This action takes place, for example, successively beginning with the start point of the collision avoidance maneuver based on the distance covered from the start point which can be established based on longitudinal and lateral speeds of the vehicle 101, as well as based on the yaw angle of the vehicle 101 which can be found out on account of an integration of the yaw rate of the vehicle 101 detected by means of a yaw rate sensor. The curvature of the avoiding path at the time t corresponds to the radius of the avoiding path in the point $(x_E/(t), y_R(x_E(t)))$. The inverse radius is also referred to as curvature of the path in the respective point. The vehicle speed is established by way of the signals of the wheel rotational speed sensors, for example. The wheel base and the self-steering gradient basically concern invariable parameters of the vehicle 101 which can be stored in a memory of the driver assistance system. The self-steering gradient is represented by $$EG = m \cdot \frac{c_{\alpha R} l_R - c_{\alpha F} l_F}{c_{\alpha R} c_{\alpha F} l} \quad (2)$$

The variables introduced in addition herein imply:
$c_{\alpha F}$ lateral tire stiffness of the front wheels
$c_{\alpha R}$ lateral tire stiffness of the rear wheels
$l_F$ distance of the front axle from the center of gravity of the vehicle
$l_R$ distance of the rear axle from the center of gravity of the vehicle
m mass of the vehicle The controlling component of the steering angle determined according to equation (1) is combined with a regulating portion $\delta_{MFB}$ of the steering angle at summation point 403. This is done by formation of sums so that it holds for the steering angle to be adjusted:

$$\delta_M = \delta_{MFF} + \delta_{MFB} \quad (3)$$

The regulating component of the steering angle is determined in the controlling block 402 based on the deviation e between the nominal lateral offset $y_R(t)$ at time t and the established actual lateral offset $y_E(t)$ of the vehicle 101 and its reference point. The deviation is determined at the subtraction point 404 according to $$e(t) = y_R(t) - y_E(t) \quad (4)$$

The nominal lateral offset in this case corresponds to the lateral offset $y_R(t)$, which is predetermined by the avoiding path. With the aid of the regulating component of the steering angle, disturbances and deviations are compensated which are not considered in the pilot control. An anticipating control is performed in one embodiment. To this end, the nominal position $(x_R(t+\Delta t), y_R(t+\Delta t))$ of the vehicle 101 is pre-calculated in the moment of observation t which the vehicle shall assume due to the predefined path after a short anticipation period $\Delta t$ of e.g. 200 ms. In this arrangement, the current longitudinal and lateral speed of the vehicle is used to predict the x-coordinates of the reference point of the vehicle for the time $t+\Delta t$ and to determine the associated nominal lateral offset $y_R(t+\Delta t)$. This nominal lateral offset is compared with the actual lateral offset $y_E(t)$ of the vehicle 101 in the moment of observation t in order to find out the deviation e. Thus, the deviation e in this embodiment is the deviation between the present lateral offset $y_E(t)$ and the nominal lateral offset $y_R(t+\Delta t)$ predetermined for a predicted position of the vehicle 101. It has shown in addition that the accuracy of the control can further be improved when the deviation e and the actual lateral offset of the vehicle 101, respectively, and the pre-calculated nominal lateral offset are transformed into a system of coordinates of a vehicle. This system is a reference system, the origin of which coincides with the position of the vehicle 101 in the moment of observation t. The positive x-axis of the vehicle's system of coordinates shows to the front in the vehicle's longitudinal direction, while the y-axis shows to the left with regard to this direction. With the use of the vehicle's system of coordinates, the deviation e reflects an offset orthogonal to the vehicle's longitudinal direction.

A linear control is used to determine the regulating component of the steering angle. This renders it possible to adapt the control in a particularly simple manner to a defined type of vehicle. However, the vehicle speed has a very great influence on the vehicle performance. Therefore, it is not possible to perform the compensation control over the entire possible speed range with the necessary rate of accuracy using one single linear controller. Rather, the linear controller can only be employed in a limited speed range in the vicinity of a working point. To be able to perform the control within the entire speed range, it is arranged to provide several linear controllers for one working point each and to superpose the output signals of these controllers. Therefore, the controlling block 402 has a structure which is shown in a schematic representation in FIG. 5.

Figure 5:
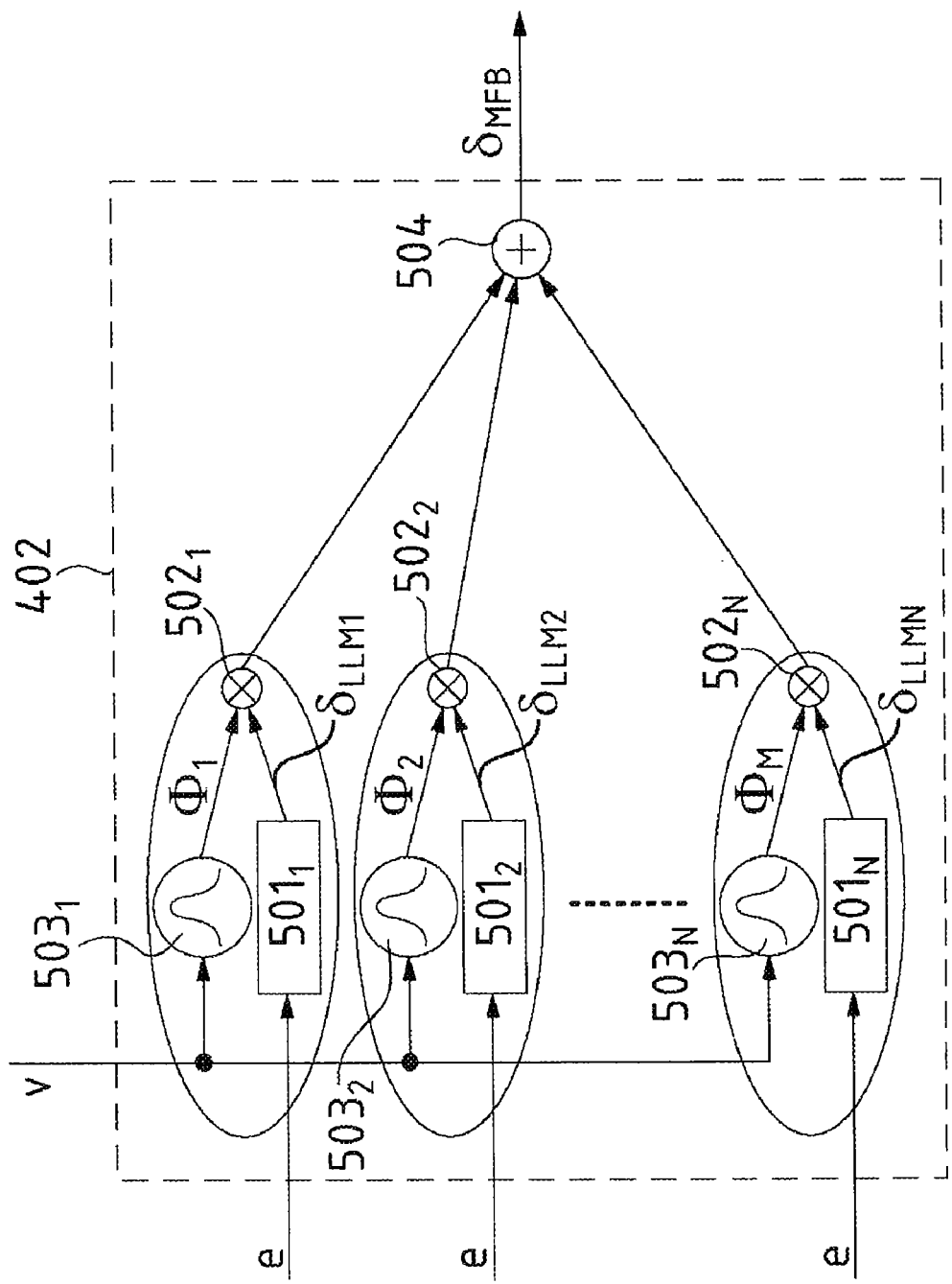
FIG. 5 is a schematic block diagram in sections of a control unit with several controller modules.

FIG. 5 exemplarily shows a controlling block 402 containing N controller modules $501_1, \ldots, 501_N$. Each controller module $501_1, \ldots, 501_N$ produces an output signal $\delta_{LLMi}$ (i=1, ..., N), which is weighted at a multiplication point $502_i$ with a weighting factor $\Phi_i$. The weighting factor is defined in a block $503_i$ based on an activation function $\Phi_i(v)$ associated with the controller module $501_i$ depending on the vehicle speed. Thus, the weighted output signal of a controller module $501_i$ is given by $$\Phi_i(v) \cdot \delta_{LLMi} \quad (5)$$

At the addition point 504, the regulating component $\delta_{MFB}$ of the steering angle to be adjusted is determined from the N weighted output signals. It holds:

$$\delta_{MFB} = \sum_{i=1}^{N} \Phi_i(v) \cdot \delta_{LLMi} \quad (6)$$

The controller modules $501_1, \ldots, 501_N$ are preferably configured as Proportional-Differential controllers (PD-controllers). A controller module $501_i$ therefore has the transmission function $$G_{PDi}(s) = K_{Pi} + K_{Di} \cdot s \quad (7)$$

where $K_{Pi}$ and $K_{Di}$ are controller parameters. In a controller module $501_i$ the output signal is therefore defined according to the following control law:

$$\delta_{LLMi}(t) = K_{Pi} \cdot e(t) + K_{Di} \cdot \frac{de(t)}{dt} \quad (8)$$

In another embodiment, the differential component (D-component) of the output signal of the controller module $501_i$ is determined by an element ($DT_1$-element) with the transmission function $$G_i(s) = \frac{K_{Di} \cdot T_{D1} \cdot s}{1 + T_{D2} \cdot s} \quad (9)$$

In general, the controller modules have a clocked operation so that the $DT_1$-element and the D-element have a discrete-time design in the embodiment mentioned before.

The activation functions $\Phi_1, \ldots, \Phi_N$ associated with the controller modules $501_1, \ldots, 501_N$ are essentially other than zero only in a limited speed range around a center-of-gravity speed. In one embodiment, the activation functions refer to Gaussian functions of the form of $$\Phi_i(v) = \frac{\mu_i(v)}{\sum_{j=1}^{N} \mu_j(v)} \quad (10)$$

with $$\mu_i(v) = \exp\left(-\frac{(v - c_i)^2}{2\sigma_i^2}\right)$$

Figure 6:
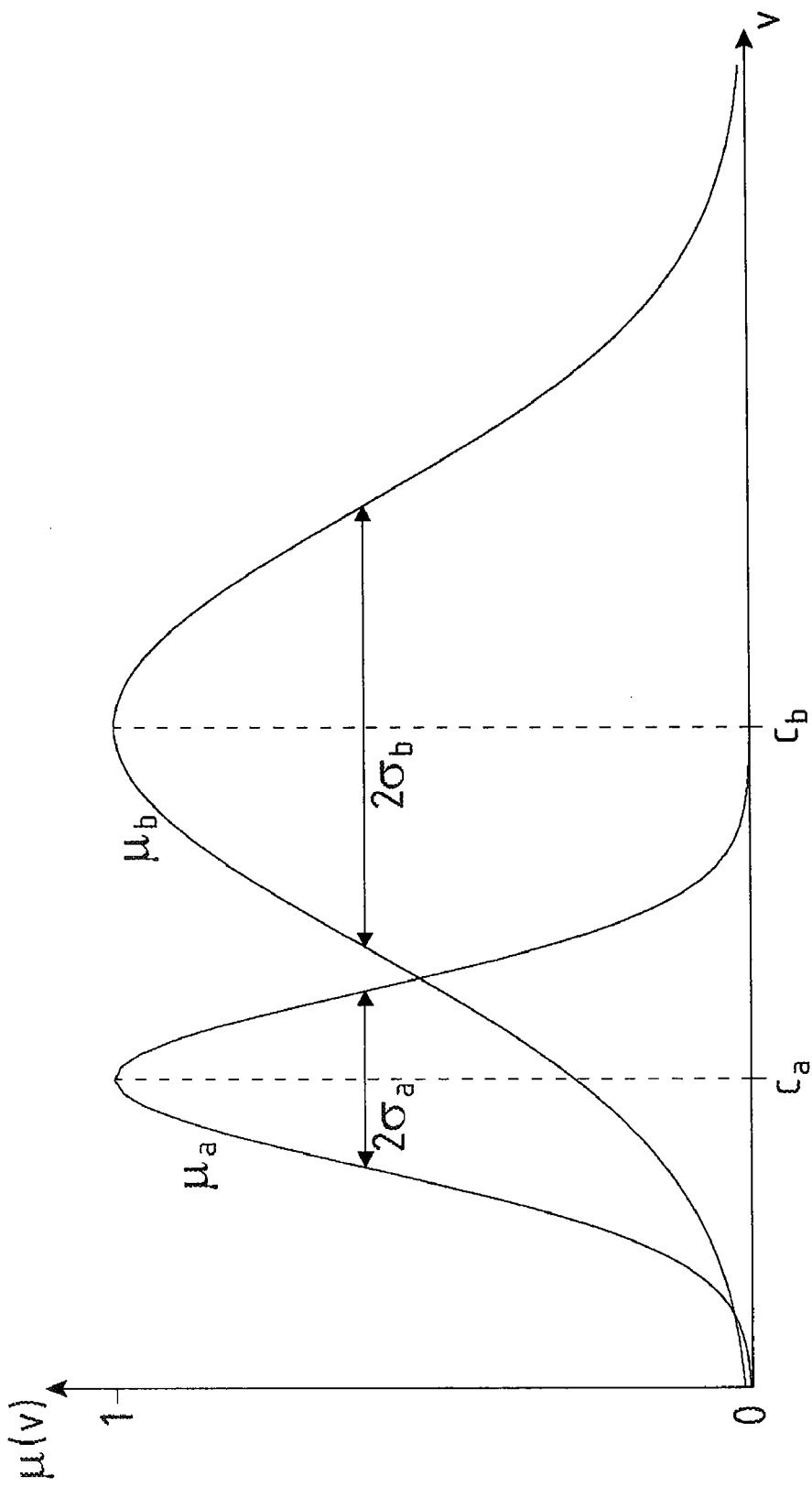
FIG. 6 is an exemplary representation of two functions which are taken into consideration for weighting the output signals of the controller modules.

The Gaussian functions $\mu_i$ are bell-shaped curves, which are symmetrical around their maximum with $v=c_i$. The parameter $\sigma_i$ defines the width of the bell-shaped curve. FIG. 6 depicts by way of example two like functions $\mu_a$ and $\mu_b$ with parameters $c_a$ and $\sigma_a$ or $c_b$ and $\sigma_b$, respectively.

The function $\mu_i(v)$ and/or the activation functions $\Phi_i(v)$ define the speed range in which the regulating component of the steering angle is decisively determined by the controller module $501_i$. The components which the other controller modules contribute are inferior compared thereto. The distribution of the center-of-gravity speeds preferably orients itself to the reciprocal vehicle speed because the latter has a very great influence on the vehicle performance due its frequent occurrence in the equations of the single-track model. In the range of low speeds the reciprocal vehicle speed changes to a relatively pronounced degree so that it is required to employ more controller modules $501_1, \ldots, 501_N$ in this range and the center-of-gravity speeds are distributed with greater density than at higher speeds. Accordingly, the width of the function $\mu_i$ in the controller modules $501_1, \ldots, 501_N$, which are provided for the ranges of low speed, is less than in the controller modules $501_1, \ldots, 501_N$, which are provided for high speed ranges.

Figure 7:
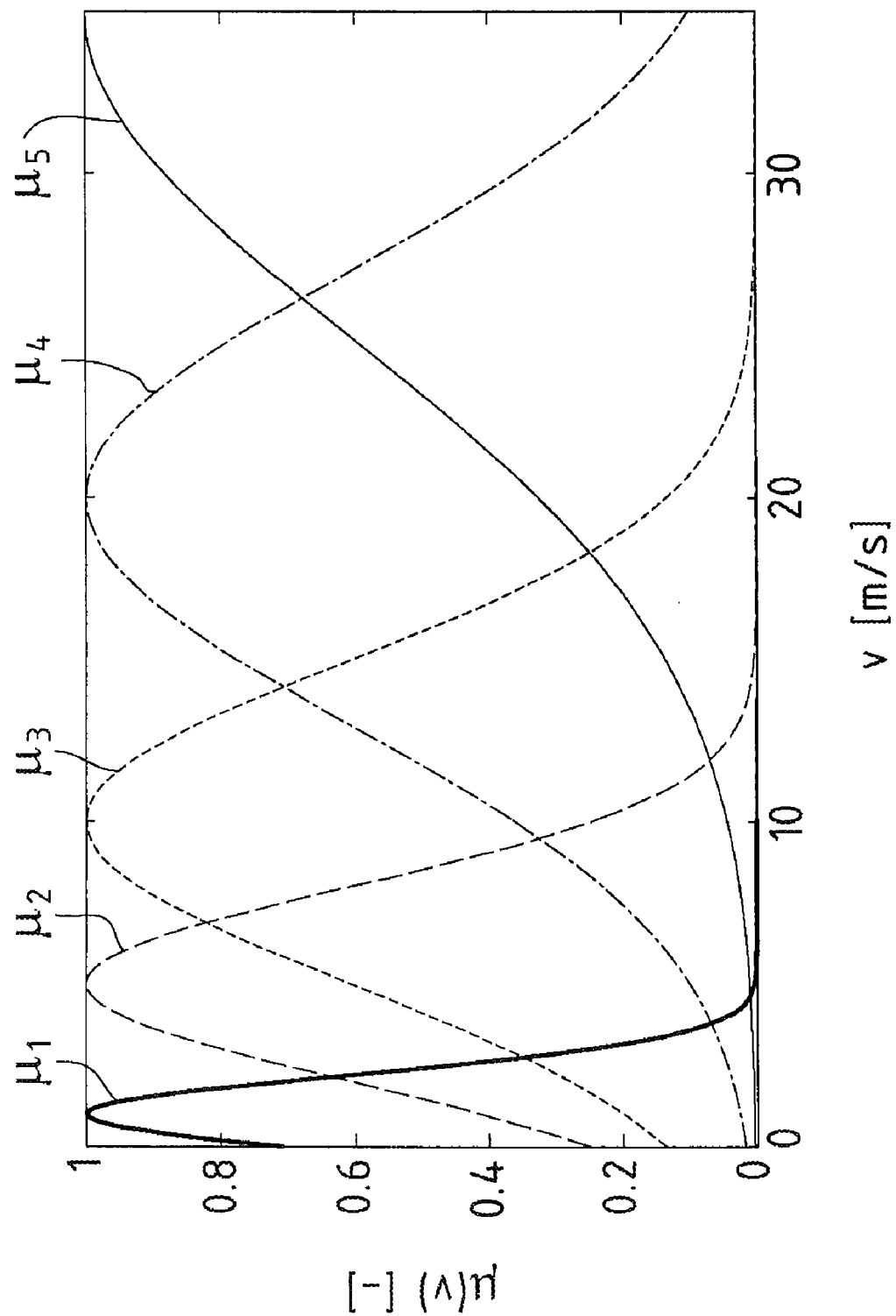
FIG. 7 is a representation of the functions which are taken into consideration in a preferred embodiment for weighting the output signals of the controller modules.

For example, at least five controller modules $501_1, \ldots, 501_5$ can be employed, associated with which are center-of-gravity speeds $c_1, \ldots, c_5$ of roughly 1 m/s, 5 m/s, 10 m/s, 20 m/s and 35 m/s. The associated functions $\mu_1, \ldots, \mu_5$ are illustrated by way of example in FIG. 7. However, it is principally also possible to use controller modules $501_1, \ldots, 501_N$ with different center-of-gravity speeds and in different numbers. The accuracy of the control enhances with a rising number of controller modules $501_1, \ldots, 501_N$. The complexity of the adjustment of the control unit 107 increases, however, also with a rising number of controller modules $501_1, \ldots, 501_N$.

The controller modules $501_1, \ldots, 501_N$ are set to a defined type of vehicle by way of a determination of the associated controller parameters $K_{P1}, \ldots, K_{PN}, K_{D1}, \ldots, K_{DN}$ and, in case of need, $T_{D1}, \ldots, T_{DN}$. The exact tuning of a controller $501_i$ can be performed in a simple manner by an analysis of driving tests which are carried out at the center-of-gravity speed $c_i$ of the controller module $501_i$. Since the linear controller modules are relatively easy to handle in this case, it is this way possible to adapt the control unit 207 to a defined type of vehicle in a simple and quick fashion.

The invention claimed is:

1. A method of steering a motor vehicle in a collision avoidance maneuver ahead of an object in the front or lateral surroundings of the motor vehicle with the following steps:
    calculating an avoiding path for the avoiding maneuver in front of the object;
    determining each one controller output signal ($\delta_{LLM1}; \ldots; \delta_{LLMN}$) based on a deviation (e) between an actual position of the motor vehicle and a nominal position predetermined due to the avoiding path in at least two linear controller modules, wherein each linear controller module is optimized for steering angle control in a defined speed range of the vehicle speed (v);
    weighting the controller output signals ($\delta_{LLM1}; \ldots; \delta_{LLMN}$) with respectively one weighting factor ($\Phi_1; \ldots; \Phi_N$) that is determined depending on the vehicle speed (v);
    determining a steering angle ($\delta_M; \delta_{MFB}$) of steerable wheels of the motor vehicle by way of arbitration of the weighted controller output signals; and
    influencing a steering system of the motor vehicle according to the determined steering angle ($\delta_M; \delta_{MFB}$).

2. The method as claimed in claim 1, wherein the controller output signals ($\delta_{LLM1}; \ldots; \delta_{LLMN}$) are determined depending on a deviation (e) between a nominal lateral offset ($y_R$) that is predetermined by way of the calculated avoiding path and a determined actual lateral offset ($y_E$) of the motor vehicle).

3. The method as claimed in claim 1, wherein the controller output signals ($\delta_{LLM1}; \ldots; \delta_{LLMN}$) are determined depending on a deviation between a nominal lateral offset ($y_R(t+\Delta t)$) of the vehicle, which is predetermined by way of the calculated avoiding path for a predicted position of the vehicle, and a current actual lateral offset ($y_E(t)$) of the vehicle.

4. The method as claimed in claim 1, wherein the deviation (e) relates to an offset of the vehicle orthogonally relative to a central longitudinal axis of the vehicle.

5. The method as claimed in claim 1, wherein the linear controller modules are at least partly proportional-differential controllers.

6. The method as claimed in claim 1, wherein the controller modules comprise at least partly one proportional element and one element for processing the deviation of the motor vehicle from a position.

7. The method as claimed in claim 1, wherein a center-of-gravity speed ($c_1; \ldots; c_N$) is associated with each controller module and in that a weighting factor ($\Phi_1; \ldots; \Phi_N$) is essentially other than zero only in a speed interval which contains the center-of-gravity speed ($c_1; \ldots; c_N$).

8. The method as claimed in claim 1, wherein the weighting factors ($\Phi_1; \ldots; \Phi_N$) assume the shape of $$\Phi_i = \frac{\mu_i(v)}{\sum_{j=1}^{N} \mu_j(v)}$$

with $$\mu_i(v) = \exp\left(-\frac{(v-c_i)^2}{2\sigma_i^2}\right)$$

where $c_i$ is the center-of-gravity speed, $\sigma_i$ is a predetermined parameter and N designates the number of the controller modules.

9. The method as claimed in claim 1, wherein a regulating component ($\delta_{MFB}$) of the steering angle ($\delta_M$) is established based on the arbitration of the weighted controller output signals and in that the steering angle ($\delta_M$) comprises a controlling component ($\delta_{MFF}$) in addition.

10. The method as claimed in claim 1, wherein the controlling component ($\delta_{MFF}$) of the steering angle ($\delta_M$) is determined based on an inverse single-track model of the motor vehicle.

11. The method as claimed in claim 1, wherein the controlling component ($\delta_{MFF}$) of the steering angle ($\delta_M$) is given by $$\delta_{MFF} = i_s\left(\frac{l}{R} + EG \cdot \frac{v^2}{R}\right)$$

where $i_s$ is a transmission factor, l is a wheel base of the motor vehicle, EG is a self-steering gradient of the motor vehicle (101), v is a speed of the vehicle and 1/R refers to a curvature of the avoiding path.

12. A computer program assembly used in steering a motor vehicle in a collision avoidance maneuver ahead of an object in the front or lateral surroundings of the motor vehicle, the computer program assembly configured to calculate an avoiding path for the avoiding maneuver in front of the object; determine each one controller output signal ($\delta_{LLM1}; \ldots; \delta_{LLMN}$) based on a deviation (e) between an actual position of the motor vehicle and a nominal position predetermined due to the avoiding path in at least two linear controller modules, wherein each linear controller module is optimized for steering angle control in a defined speed range of the vehicle speed (v); weight the controller output signals ($\delta_{LLM1}; \ldots; \delta_{LLMN}$) with respectively one weighting factor ($\Phi_1; \ldots; \Phi_N$) that is determined depending on the vehicle speed (v); determine a steering angle ($\delta_M; \delta_{MFB}$) of steerable wheels of the motor vehicle by way of arbitration of the weighted controller output signals; and output the determined steering angle ($\delta_M; \delta_{MFB}$) to a steering system of the motor vehicle.

13. A device for steering a motor vehicle in an avoiding maneuver ahead of an object in the front or lateral surroundings of the motor vehicle, comprising:

a path planning arrangement allowing calculation of an avoiding path for the avoiding maneuver;

a regulating arrangement comprising at least two linear controller modules, in which case one controller output signal ($\delta_{LLM1}; \ldots; \delta_{LLMN}$) each can be determined in the linear controller modules according to a deviation (e) between an actual position of the motor vehicle and a nominal position predetermined based on the avoiding path, wherein each linear controller module is optimized for steering angle control in a defined speed range of the vehicle speed (v);

a weighting arrangement used to weight the controller output signals ($\delta_{LLM1}; \ldots; \delta_{LLMN}$) in each case with a weighting factor ($\Phi_1; \ldots; \Phi_N$) that is established depending on a vehicle speed (v);

an arbitration device used to determine a steering angle ($\delta_M; \delta_{MFB}$) of steerable wheels of the motor vehicle by way of arbitration of the weighted controller output signals, and a steering actuator controlling arrangement by which a steering actuator can be steered according to the steering angle ($\delta_M; \delta_{MFB}$), and a steering system of the motor vehicle can be influenced by means of the steering actuator.

* * * * *

UNITED STATES PATENT AND TRADEMARK OFFICE
CERTIFICATE OF CORRECTION

PATENT NO. : 8,355,842 B2 Page 1 of 1
APPLICATION NO. : 12/066695
DATED : January 15, 2013
INVENTOR(S) : Arbitmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1143 days.

Signed and Sealed this
First Day of September, 2015

Michelle K. Lee
*Director of the United States Patent and Trademark Office*